US011498633B2

(12) United States Patent
Hatch et al.

(10) Patent No.: US 11,498,633 B2
(45) Date of Patent: Nov. 15, 2022

(54) BICYCLE RAMP

(71) Applicants: Richard J. Hatch, Pittsburgh, PA (US); Amatheon Bohan, Pittsburgh, PA (US)

(72) Inventors: Richard J. Hatch, Pittsburgh, PA (US); Amatheon Bohan, Pittsburgh, PA (US)

( * ) Notice: Subject to any disclaimer, the term of this patent is extended or adjusted under 35 U.S.C. 154(b) by 131 days.

(21) Appl. No.: 17/145,450

(22) Filed: Jan. 11, 2021

(65) Prior Publication Data
US 2021/0171143 A1 Jun. 10, 2021

Related U.S. Application Data (63) Continuation-in-part of application No. 15/997,980, filed on Jun. 5, 2018, now Pat. No. 10,926,821.

(51) Int. Cl.
*B62H 3/08* (2006.01)

(52) U.S. Cl.
CPC .................. *B62H 3/08* (2013.01)

(58) Field of Classification Search
CPC ...... B62H 3/08; B62H 7/00; A63B 2069/164; A63B 69/16; A63B 2225/11
See application file for complete search history.

(56) References Cited

U.S. PATENT DOCUMENTS

| | | | | |
|---|---|---|---|---|
| 4,526,554 A | * | 7/1985 | Goldfarb | A63H 29/24 446/440 |
| 6,755,599 B1 | * | 6/2004 | Plyler | B60T 3/00 211/21 |
| 9,919,236 B1 | * | 3/2018 | Gross | A63K 3/02 |
| 2008/0159838 A1 | * | 7/2008 | Sherer | B60P 1/435 414/537 |
| 2016/0168843 A1 | * | 6/2016 | Bell | B60P 3/122 52/64 |
| 2016/0214026 A1 | * | 7/2016 | Romer, Jr. | A63K 3/02 |
| 2017/0296940 A1 | * | 10/2017 | Bethers | A63C 19/10 |

* cited by examiner

*Primary Examiner* — James S. McClellan (57) ABSTRACT

The bicycle ramp of the present invention is foldable and easily transportable. The bicycle ramp of the present invention may be built directly onto a utility trailer with a foldable gate and wheels and thus is transportable to be pulled along the back of a suitable vehicle using the hitch. The bicycle ramp of the present invention creates an inclined surface for bicycle riding applications, including the teaching of a beginning cyclist skills such as balancing and pedal. There is a receiving slot to engage the rear wheel of the bicycle at the flat upper section of the bicycle ramp. The receiving slot stabilizes the bicycle in a static position until a releasable stopper is released to launch the rider down the angled sections of the bicycle ramp.

19 Claims, 9 Drawing Sheets

BICYCLE RAMP

PRIORITY CLAIM

This Application claims priority to and is a Continuation-In-Part application of U.S. Ser. No. 15/997,980, filed on Jun. 5, 2018, entitled, "Methods for Training a Person to Ride a Bicycle Using Angular Momentum," herein incorporated by reference in its entirety.

BACKGROUND OF THE INVENTION

Learning how to ride a two-wheel bicycle requires both coordination and balancing skills. Riders may also have to overcome apprehension and fear of falling. Both children and adults who are beginner cyclists could benefit from a safe and effective method of learning how to ride a bicycle.

The methods of the present invention provide for instruction on an inclined surface, including a bicycle ramp, on how to independently ride a two-wheel bicycle. The methods include teaching all necessary bicycle riding skills, beginning with independently balancing and steering the bicycle while the bicycle is in motion, and also including pedaling the bicycle while balancing the bicycle in a vertically upright position, and starting the bicycle into motion with the pedals so that the rider obtains a vertically upright moving position. The skills can be learned in a relatively short amount of time, on any suitable bicycle, for any capable student, without a huge physical burden on the instructor, with predictable results.

The bicycle ramp of the present invention is foldable and easily transportable. The ramp is designed to be used for bicycle riding, including for lessons to teach students how to ride. The ramp provides an inclined surface that can be used in any suitable location, including parking lots, parks, warehouses, and fields and thus acts as an inclined surface in which to repetitively teach the bicycle skills in a relatively short amount of time, on any suitable bicycle, for any capable student, without a huge physical burden on the instructor, with predictable results.

SUMMARY OF THE INVENTION

One embodiment described herein is a bicycle ramp comprising: a flat upper section comprising a receiving slot for engaging a rear wheel of a two-wheeled bicycle, wherein the receiving slot is defined by vertical and horizontal supports and a releasable stopper that is designed to move between a static position and a dynamic position, wherein in the static position, the bicycle is stabilized at the top of the ramp, and wherein in the dynamic position, the bicycle is allowed to move, and means for switching the releasable stopper between the static and dynamic positions; a first angled section connected to the flat upper section; and a second angled section that is connected to the first angled section and that is foldable onto the first angled section.

Another embodiment described herein is a combination of a bicycle ramp and a utility trailer comprising: a bicycle ramp comprising a flat upper section comprising a receiving slot for engaging a rear wheel of a two-wheeled bicycle, wherein the flat upper section is supported by the utility trailer and one or more angled sections to connect the flat upper section to a beneath surface; and a wheeled utility trailer that supports the flat upper section of the ramp and the one or more angled sections of the ramp and further comprising a foldable gate.

Another embodiment described herein is a method of riding a two-wheeled bicycle down a bicycle ramp comprising: positioning a rider on a two-wheeled bicycle at the top of a bicycle ramp, wherein the ramp comprises one or more angled sections and a flat upper section, wherein the flat upper section comprises a receiving slot for engaging a rear wheel of the bicycle, wherein the receiving slot is defined by vertical and horizontal supports and a releasable stopper that is designed to move between a static position and a dynamic position, wherein in the static position, the bicycle is stabilized at the top of the ramp, and wherein in the dynamic position, the bicycle is allowed to move, and means for switching the releasable stopper between the static and dynamic positions; switching the releasable stopper from the static position to the dynamic position; and allowing the bicycle to move down the angled section of the ramp.

DETAILED DESCRIPTION OF THE INVENTION

The ramp of the present invention is foldable and easily transportable. The ramp of the present invention may be built directly onto a utility trailer having wheels and thus is transportable and pulled along the back of a suitable vehicle using the hitch. The ramp of the present invention is thus transportable to be used in parking lots, warehouses, in fields, in parks, and in other suitable locations, both indoor and outdoor.

Figure 1:
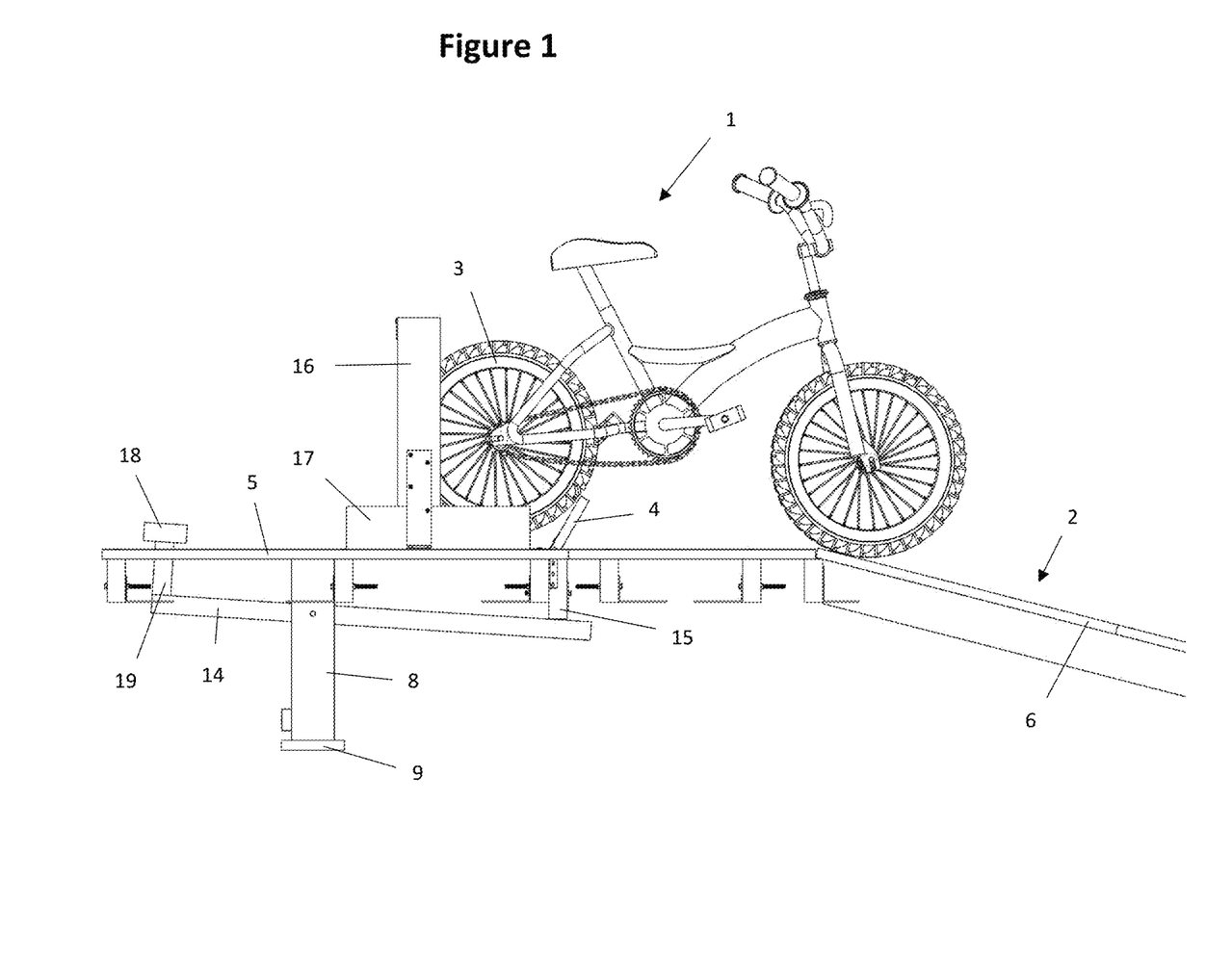
FIG. 1 is a side view of the top part of the ramp of the present invention.

FIG. 1 is a side view of the top part of the ramp 2, showing bicycle 1 placed at the top of the ramp 2. The bicycle's back wheel 3 engages with a releasable stopper 4 and vertical supports 16 and horizontal supports 17. The ramp 2 has several sections. There is an upper flat section 5, which can be referred to as a launch pad area, having the vertical supports 16 and horizontal supports 17 and releasable stopper 4.

Figure 9:
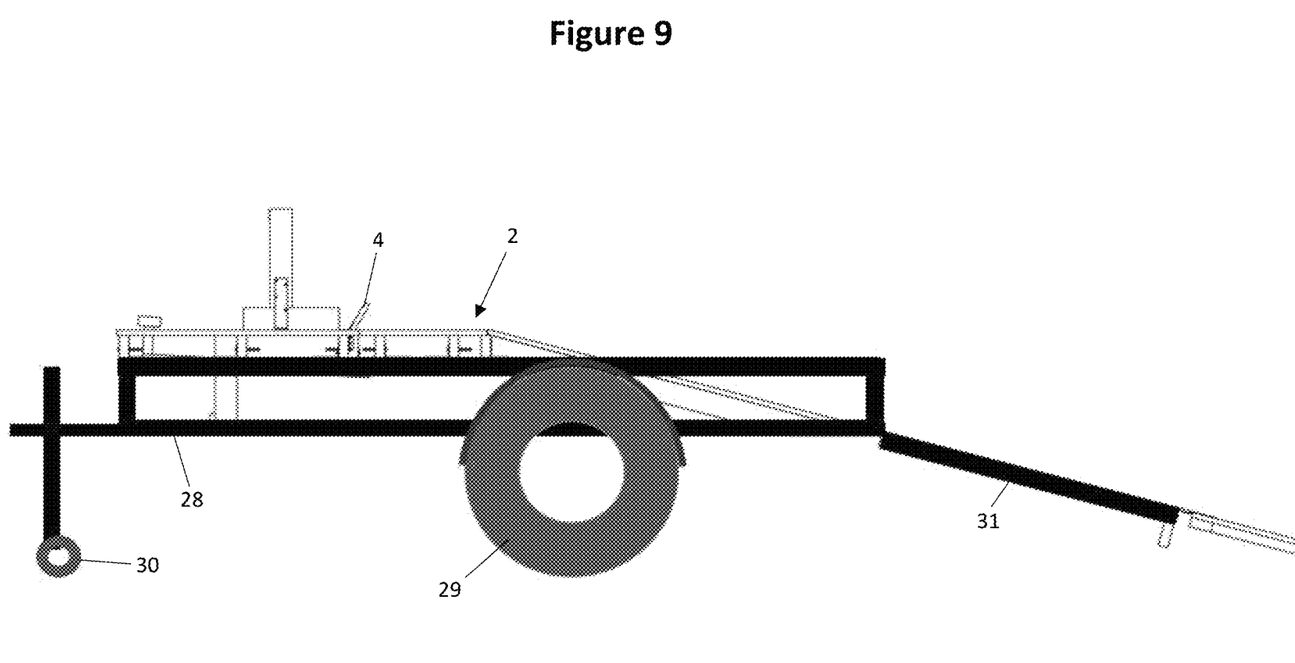
FIG. 9 is a side view of an embodiment of the ramp designed to be supported on top of a utility trailer.

In one embodiment, the ramp 2 is built on top of a utility trailer 28 as seen in FIG. 9. In addition to the flat upper section 5, there may be one or more angled sections of the ramp 2 that provide the ramp's length, connect to the upper flat section 5, and ultimately engage the ground or other surface on which the ramp is used.

In one embodiment, there is an angled first section 6 that is connected to the upper flat section 5 that sits on top of and is supported by the utility trailer 28. An edge of upper flat section 5 is flush with an edge of angled first section 6 at seam 7. Angled first section 6 is also supported by the trailer 28. Support 8 extends downward from the upper flat section 5. The foot 9 of support 8 may sit directly on the utility trailer 28.

Building the ramp 2 directly onto a utility trailer 28 is a preferred embodiment. In other embodiments, the foot 9 of support 8 may engage the ground or any other appropriate flat surface. However, the height of support 8 would need to be adjusted accordingly in this embodiment. Further, there may need to be other modifications to the ramp's design if it were to be used directly on the ground without the use of the utility trailer 28. As an example, if the ramp 2 is to be used with or without a trailer, multiple supports 8 may be used to provide stability to the ramp 2 and the foots 9 of those supports 8 may be enlarged to have more surface area.

If the ramp of the present invention is built directly onto the surface of a utility trailer, then the support 8 doesn't need to be as high as when the ramp 2 is designed to sit directly on the ground. As depicted in the figures, the support 8 is about 1.2 feet in height, and is in this embodiment designed to be built directly onto the surface of the utility trailer 28. The support 8 may be higher for applications of bicycle riding that don't involve beginners, such as stunt riding. The horizontal surface of the utility trailer 28, considering standard wheels is about 1.5 feet off of the ground. In the embodiment wherein the support 8 is designed to engage the ground without the height of a utility trailer, that support 8 or multiple supports 8 is preferably about 2.5 feet to about 3 feet in height.

Figure 2:
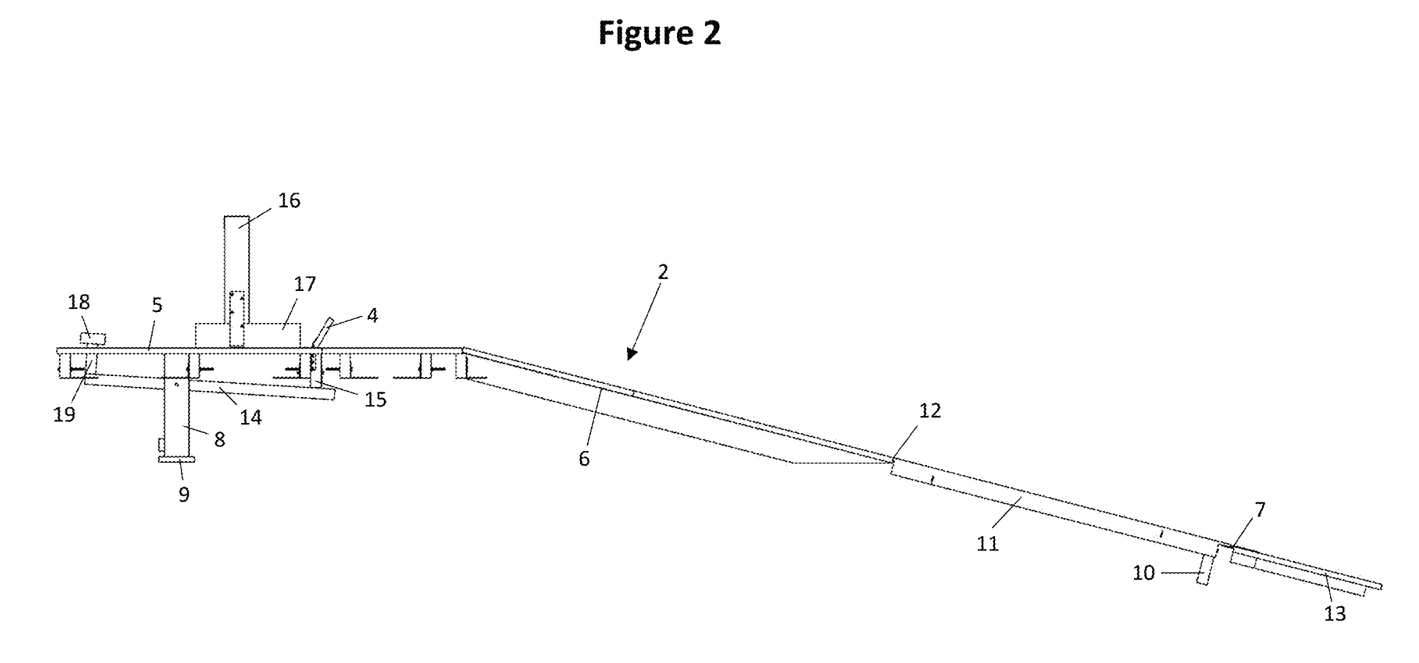
FIG. 2 is a side view of the ramp of the present invention in its fully extended position.

FIG. 2 is a side view of the ramp 2 in its fully extended position. The overall length of the angled sections (6, 11, and 13) is preferably about 10 to about 15 feet, and more preferably, about 11.3 feet in total length, in the fully extended position, as seen in FIG. 2. Any range of total length of about 10 to about 15 feet is contemplated for uses involving beginning cyclists. It is further contemplated that a bike rider, after riding down the ramp, will continue to ride along a flat surface, such as a field or parking lot, for another several feet, possibly up to about 10-30 additional feet. The upper flat section 5 should be about 2.5 to 3 feet, preferably, about 2.8 feet off of the ground. The upper flat section 5 of the ramp can be accessed via suitable steps (not shown) or another access ramp, fitted with railings or otherwise. In this embodiment, one rider could be riding down the ramp, while a second rider could be accessing the upper flat section 5 via another back ramp or steps (not shown). Or, riders could simply walk their bicycles up and down the ramp 2.

Suitable ramp materials include wood, fiberboard, aluminum, metal grading, composites, plastics, and the like. The ramp's materials should be selected for strength, durability, and transportation by utility trailer. One or more of the ramp's sections' surfaces may include a layer of padding for safety. The ramp 2 is of suitable width in which to ride a bicycle. The upper flat section 5 may be slightly wider in width as compared to the widths of angled ramp sections 6, 11, and 13. Embodiments include widths that are about 6 to 7 feet wide, preferably, about 6.3 feet to about 6.7 feet wide. These widths correspond to the dimensions of standard utility trailers, which is generally about 10 feet long by 6 feet wide. The utility trailer has a foldable gate and railings. The ramp may also include sides, railings, padding, or the like on either side of the width.

FIG. 2 shows all the sections of the ramp 2 of an embodiment. Starting at the top of the ramp 2, there is an upper flat section 5, which is about 4.8 feet in length. Next, there is an angled first section 6 that is about 5.3 feet in length. Next, there is a second angled section 11, which is about 4.2 in length. Finally, there is a bottom section 13 that is about 1.8 feet in length that engages the ground (not shown). Support 10 supports the ramp and is positioned on second angled section 11 and acts to engage the ground (not shown). Hinge 12 connects second angled sections 6 and 11. Bottom section 13 of the ramp makes about an about 13 to 15 degree, preferably about 13.5 to about 14.5 degree angle with the ground. Bottom section 13 connects to second angled section 11 at hinge 7, making bottom section 13 foldable onto second angled section 11.

Figure 3:
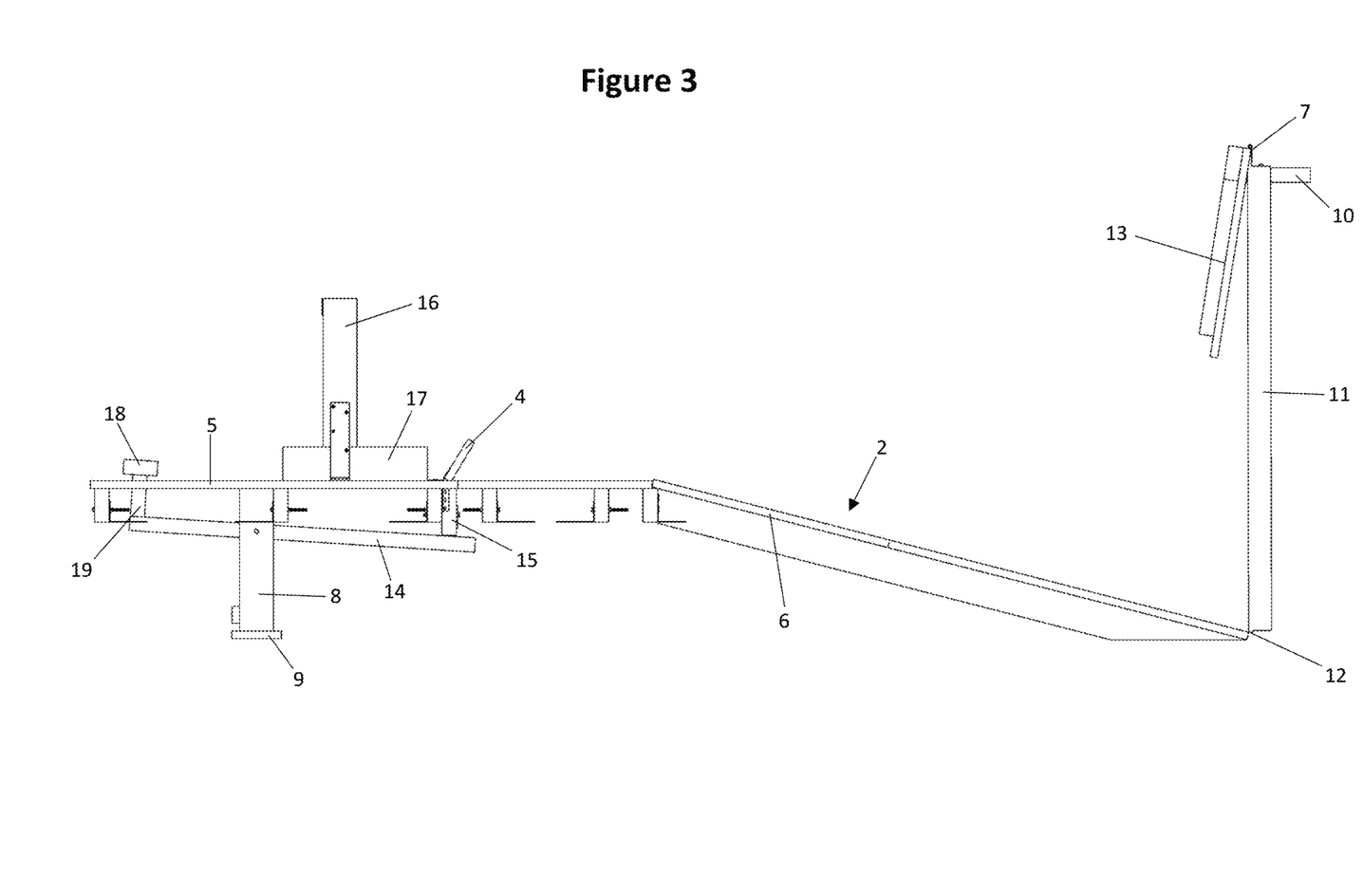
FIG. 3 is a side view of the ramp of the present invention in a folded position.

FIG. 3 is a side view of the ramp 2 in a folded position. In FIG. 3, bottom section 13 is folded onto second angled section 11. Sections 11 and 13 together can be folded over onto angled first section 6. Once, sections 11 and 13 are folded over onto first section 6, the ramp 2 is in its travel or transportable position. Thus, the length of upper section 5 and first section 6 together is about 10 feet. This length corresponds to the length of a standard utility trailer. FIG. 9 also illustrates the utility trailer 28 supporting the various sections of ramp 2.

Figure 4:
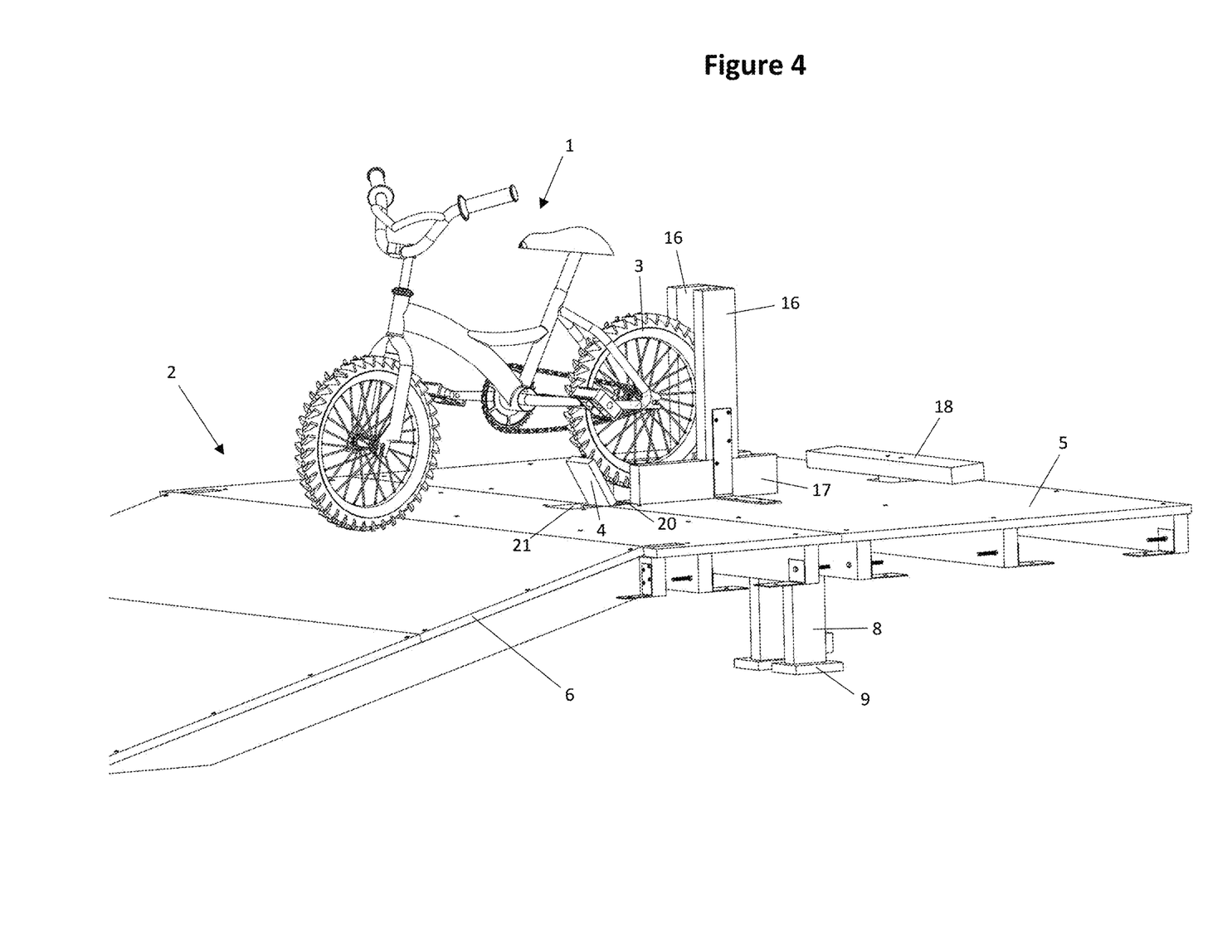
FIG. 4 is a partial perspective view of the top of the ramp of the present invention.

FIG. 4 is a partial perspective view of the ramp 2 with bicycle 1 placed upon the upper launch pad section 5. The bicycle's back wheel 3 engages a releasable stopper 4, which is in the upright or static position as seen in FIG. 4. The bicycle's rear wheel 3 is supported and stabilized by vertical supports 16 and horizontal supports 17, which act to create a receiving slot for the rear wheel 3. In the static position, the releasable stopper 4 holds the bicycle still on the upper section 5. A user can thus get positioned on the bicycle while the releasable stopper 4 is in the upright position and while the rear wheel 3 is supported and stabilized by vertical supports 16 and horizontal supports 17. An instructor may stand behind vertical supports 16 on the upper section 5. The upper section 5 is designed so that the back wheel 3 of the bicycle 1 rests within the receiving slot that is defined by vertical supports 16 and horizontal supports 17, while the front wheel of the bicycle 1 rests on the first angled section 6 of the ramp 2.

In the flat or dynamic position, the releasable stopper 4 no longer stops the back wheel 3 of the bicycle 1. In the flat position, the bicycle 1 moves down the length of the ramp's various angled sections. The instructor may push down on back piece 18, which is operably connected to the releasable stopper 4 underneath the upper section 5. The back piece 18 is like a releasable pedal that may be pushed by an instruction with his foot or by placing a weighted object on it to maintain pressure. The stopper 4 will automatically fall to the "flat" position due to gravity (and the force or weight of the bicycle 1 and rider) once the instructor releases the pressure from the back piece 18. The stopper 4 will remain in the upright position (fixing the bike in place) if the instructor is still applying downward pressure to releasable back piece or pedal 18.

In order for the stopper 4 to remain in the upright position, a constant downward force needs to be applied to the back piece 18. This force can be applied by a person or by any suitable weighted object. Once the force is removed, the back piece 18 rises while the stopper 4 falls back into place flush with the upper section 5 (this is where the mechanism underneath the ramp 2 is at equilibrium).

Figure 5:
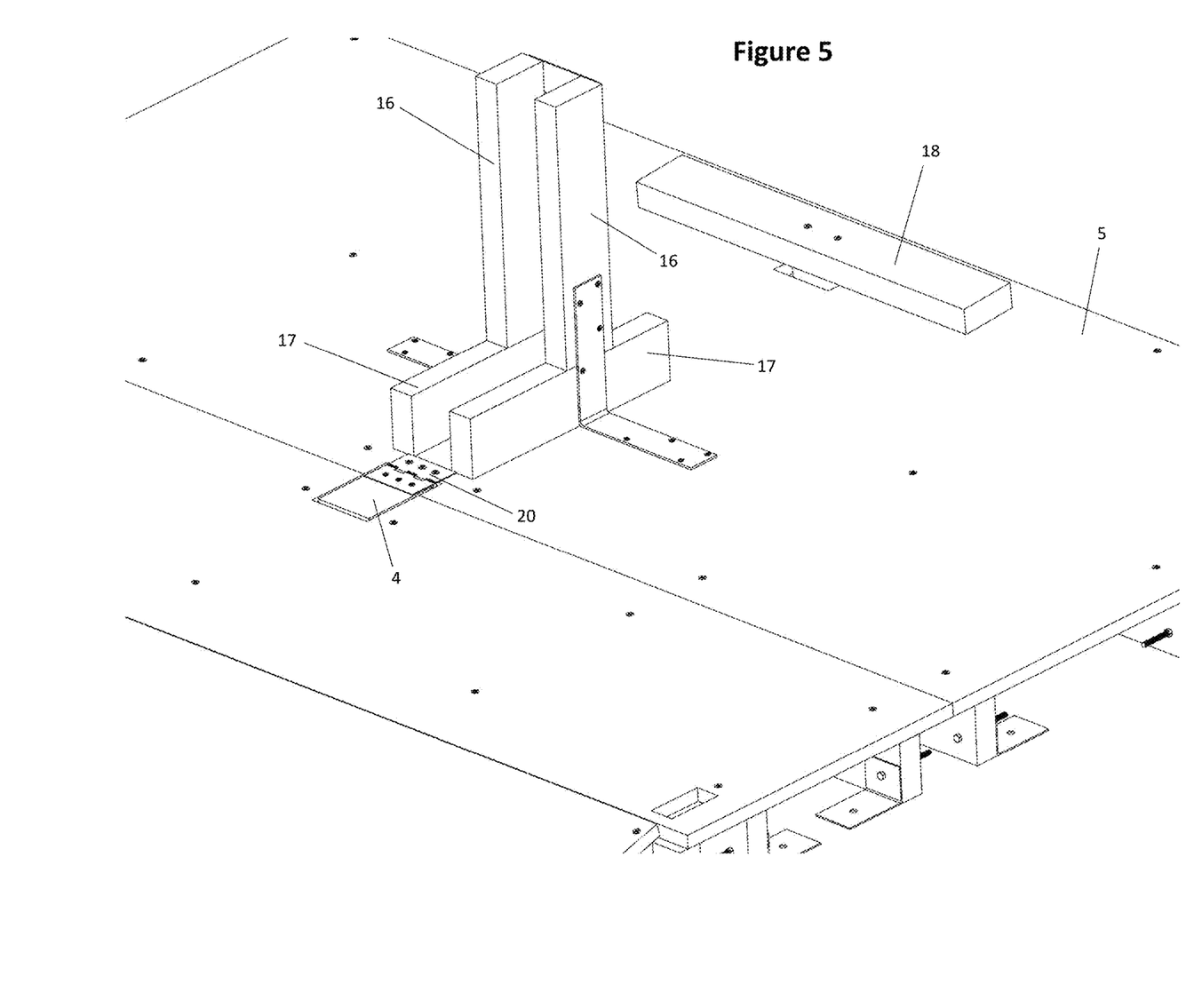
FIG. 5 is a partial perspective view of the top of the ramp of the present invention.
Figure 6:
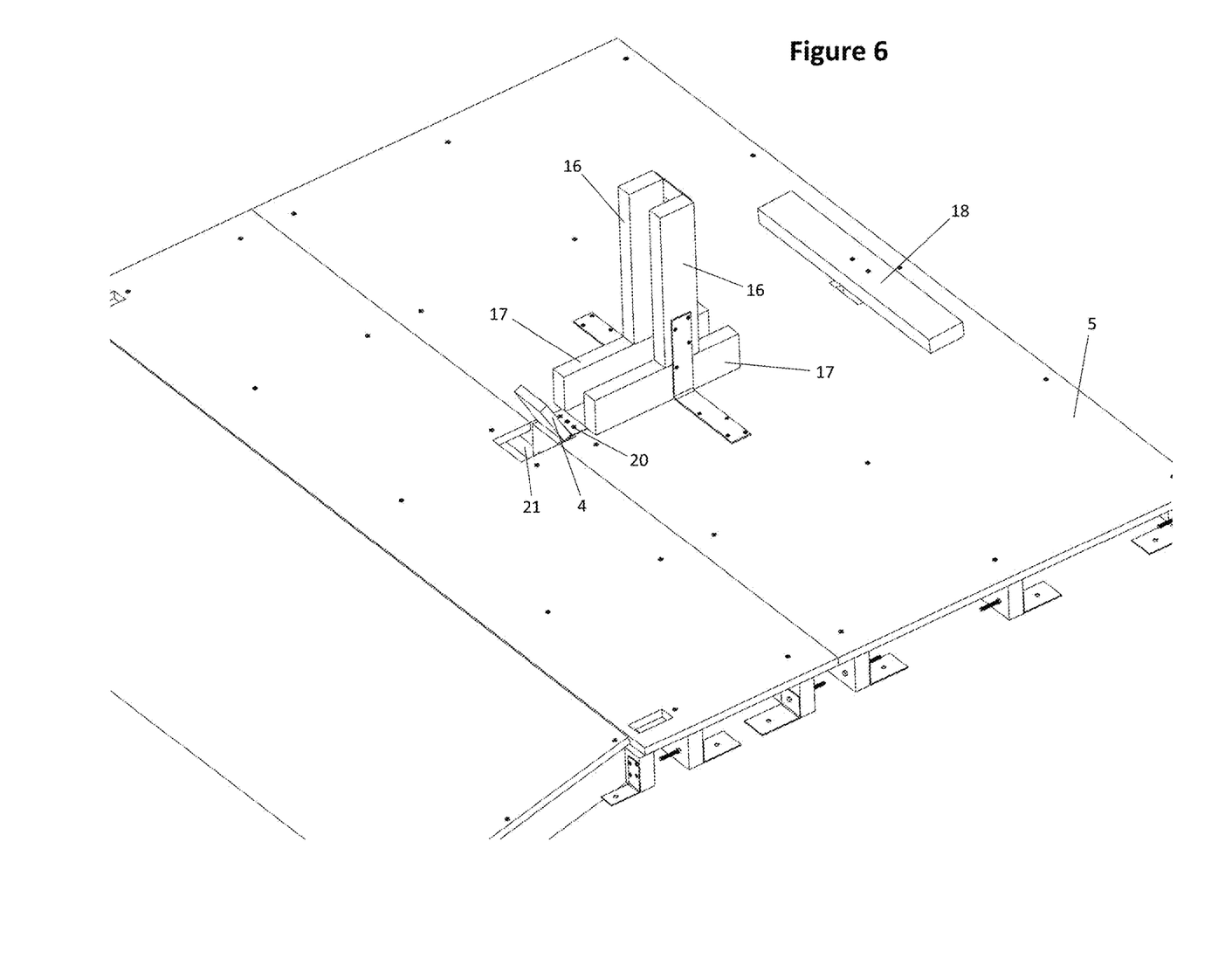
FIG. 6 is a partial perspective view of the top of the ramp of the present invention.

The instructor releases the continuous pressure on the back piece 18 acting to release the releasable stopper 4 from the upright position. It then falls into the flat position and the bicycle's rear wheel 3 is allowed to move unrestrictedly. FIG. 5 is a partial top perspective view of the ramp 2 of upper section 5. FIG. 6 is a partial top perspective view of the ramp 2 of upper section 5. Releasable stopper 4 is rectangular in shaped and is connected to the upper section 5 via hinge 20. In FIG. 5, the releasable stopper 4 is flat or flush to the upper section 5 of the ramp 2, allowing the bicycle 1 to move. In FIG. 6, the releasable stopper 4 is in the upright position, creating a hole 21 in the upper section 5 of the ramp 2.

Figure 7:
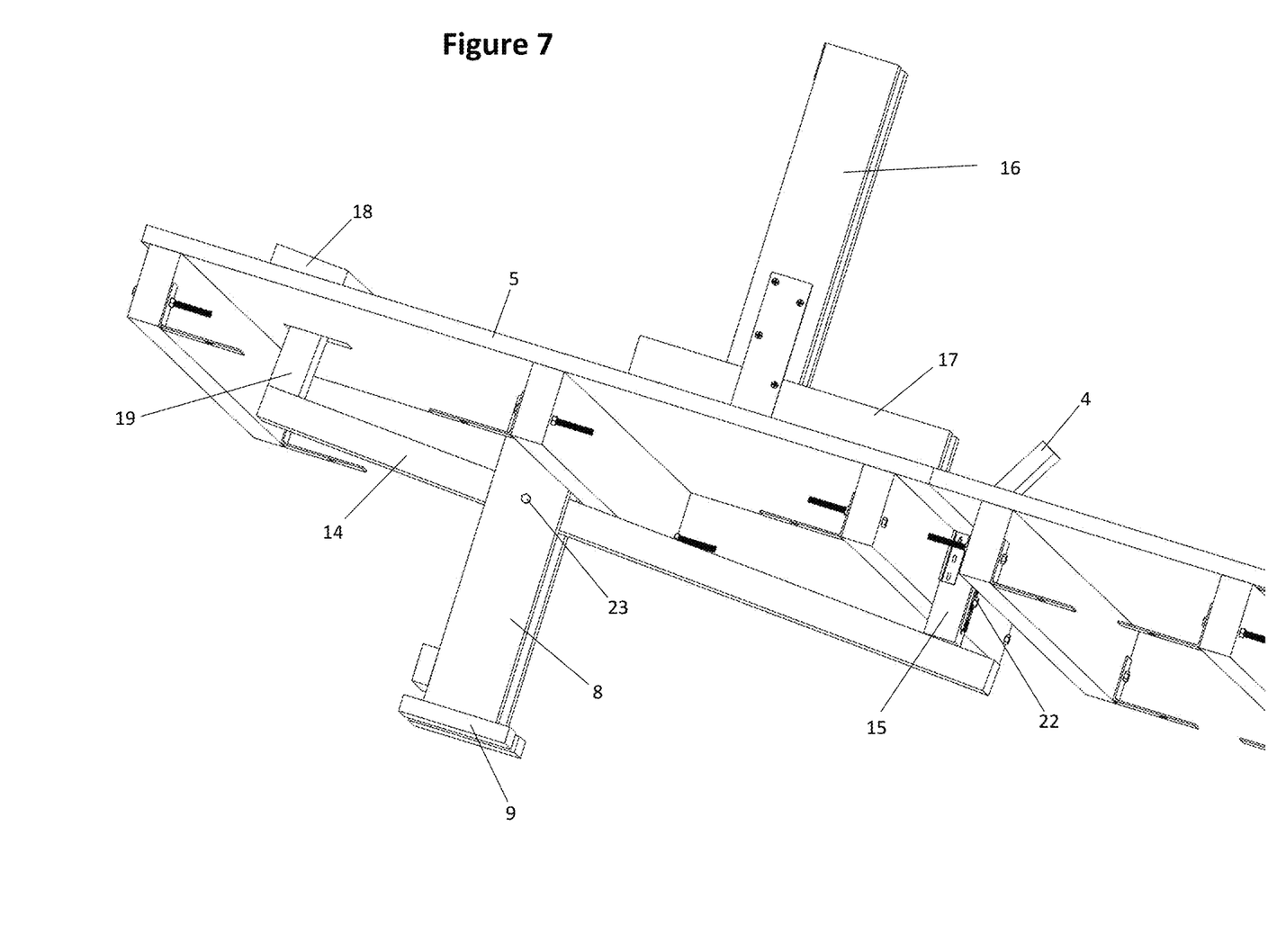
FIG. 7 is a partial perspective view of the underneath of the upper section of the ramp of the present invention.

FIG. 7 is a partial perspective view of the ramp 2 from underneath upper section 5. The back piece 18 is operably connected to the releasable stopper 4 underneath the upper section 5 through several linking pieces. Back piece 18 extends above upper section 5 and is continuous with vertical support 19, which extends below upper section 5. Vertical support 19 of back piece 18 connects to horizontal support 14, which extends in length through vertical support 8. At pivot point 23, horizontal support 14 pivots like a fulcrum. If back piece 18 is pushed downward, horizontal support 14 pushes vertical support 15 upward, which is connected to the releasable stopper 4. If the pressure is removed from the back piece 18, the vertical support 19 will thus move upwards and the vertical support 15 will move downwards, teetering about pivot point 23.

Figure 8:
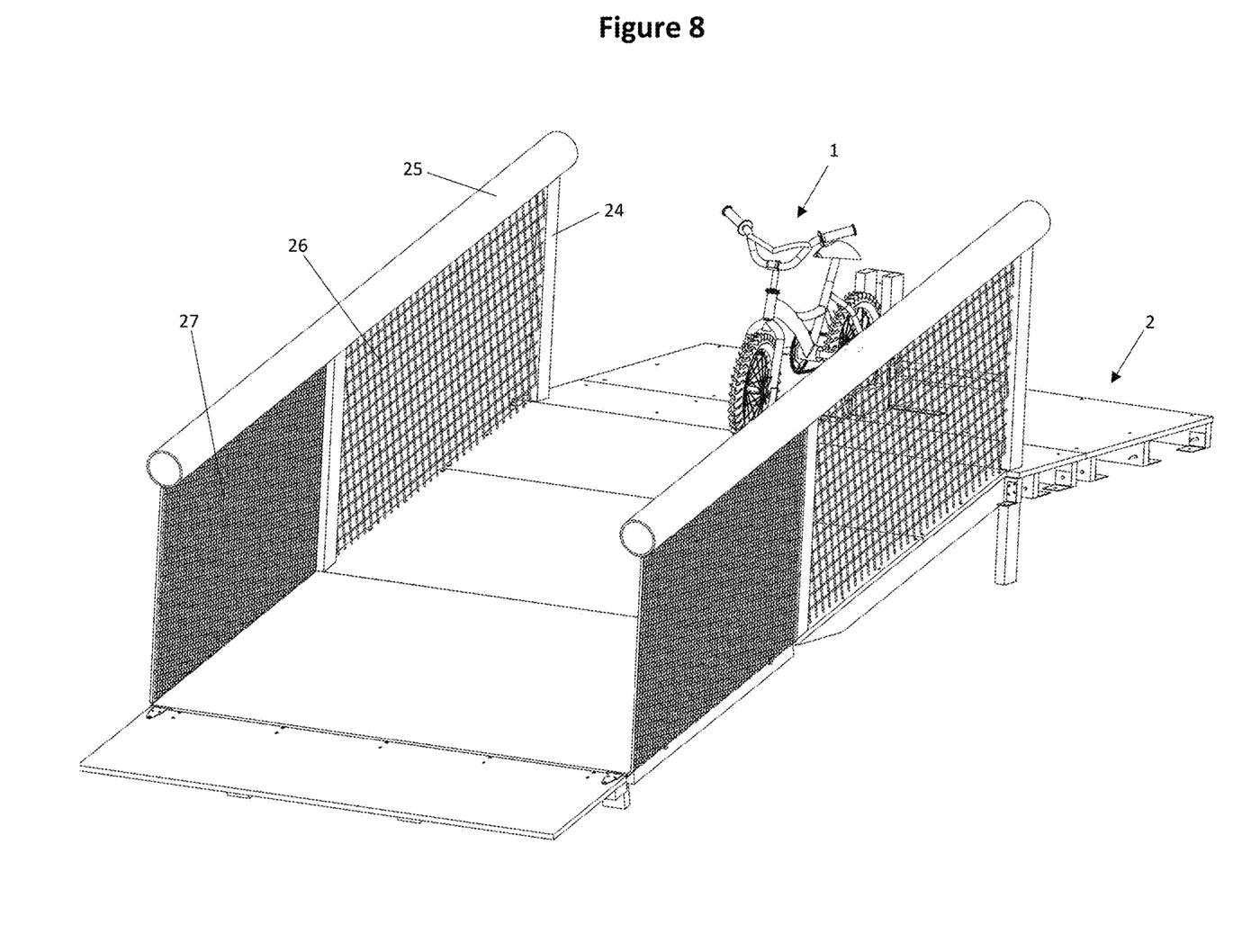
FIG. 8 is a perspective view of an embodiment of the ramp having safety railings.

FIG. 8 is a perspective view of the fully extended ramp 2 with bicycle 1 placed into the launch pad area at the top of the ramp 2. FIG. 8 details an embodiment wherein the sides of the ramp have safety barriers or railings to prevent the bicycle from toppling off of the edge of the angled ramp sections. The vertical support 24 of the barriers act to give the barriers the majority of its height and support. The barriers are about 3.3 feet to about 4 feet in height, preferably about 3.5 feet. The top bar 25 of the barrier is preferably padded. The fencing 26 and 27 of the railings can be of varying densities. Fencing 26 is less tightly woven than the fencing 27 in this depicted embodiment. The top bar 25 of the barrier and the fencing 27 may be removed while the top fencing 26 and the support 24 may be permanent fixtures on the ramp 2 as they do not impede the ramp's ability to fold up. Similar to the ramp's materials, a variety of materials may be appropriate for the barrier, including, but not limited to light weight metals with padded surfaces, plastics, wood and wood composites, and the like.

FIG. 9 is a side view of the ramp 2 in its fully extended position where the ramp 2 has been built directly onto a utility trailer 28. Upper section 5 of the ramp 2 is thus supported by the top railing of the trailer 28. First angled section 6 extends from upper section 5 to the very end of the back of the trailer 28. The utility trailer 28 is about 10 feet long and has wheels 29. When the ramp 2 is being used with bicycles, its kickstand 30 will be appropriately locked and secured. The trailer's gate 31 may be the second angled section 11 of ramp 2. Alternatively, angled section 11 of the ramp may be built directly on top of trailer's gate 31 and thus have the same dimensions of the trailer's gate 31. When the trailer's gate 31 is folded up onto section 6 of the ramp, the ramp 2 and trailer 28 combination will be in the travel position. The utility trailer 28 has a hitch to connect it to the back of a truck or any other suitable vehicle.

The ramp 2 may be used for bicycle riding. The bicycle 1 is placed into the launch pad area on the ramp's upper flat section 5. The bicycle's rear wheel 3 is supported and stabilized by vertical 16 and horizontal 17 supports. The releasable stopper 4 is used to control the start of the bicycle's motion down the angled sections of the ramp 2.

The ramp 2 may be used for bicycle riding, lessons, training, stunts, tricks, BMX, X-game, recreation, competitions, and for any other suitable two-wheeled bicycle use. While it is specifically contemplated herein to use the ramp 2 to teach beginner riders how to ride a bicycle, the length and steepness of the ramp 2 may be adjusted for use for more experienced riders. The launch pad area 5, with its vertical 16 and horizontal 17 supports and releasable stopper 4 and the applying and releasing pressure to back piece 18, and the underneath mechanism detailed in FIG. 7 may be used for any bicycle application.

One use of the ramp 2 is for teaching a beginning rider how to ride a bicycle, making use of angular momentum and gyroscopic precession. Specifically, positioning a student on the bicycle 1 at the top of ramp 2 allows the student 1 to use the angular momentum generated by the bicycle 2 traveling down the inclined surface. The slope of the inclined surface of the ramp is designed so that a student can generate enough speed on the bicycle 1 so that the student can learn the feeling of balancing the bicycle without the need to have to generate that speed herself. Additionally, the length of the ramp and/or the flat surface at the bottom of the ramp is designed so that this step of traveling down the ramp may be repeatable. The distance of the ramp 2 helps the student practice this skill repeatedly until mastered.

There are a series of steps that may be followed in order to teach a student how to ride a bicycle and master the skills of balancing, steering, pedaling, and starting the bicycle. These methods have been described in related application U.S. Ser. No. 15/997,980, filed on Jun. 5, 2018, entitled, "Methods for Training a Person to Ride a Bicycle Using Angular Momentum," herein incorporated by reference in its entirety.

The concept that a moving two-wheeled bicycle is easier to balance than a stationary one is the principal of gyroscopic precession (rotation). A bicycle wheel acts like a giant gyroscope. A spinning bicycle wheel resists efforts to tilt it and point the axle in a new direction. Any rapidly spinning wheel exhibits this gyroscopic property and this tendency acts to keep a student upright while riding a bicycle down an inclined surface.

Speeds of about 3 mph to about 15 mph can be obtained using an inclined surface, such as ramp 2, having a slope of about 8 to about 15 degrees. In one embodiment, the speed is about 5 to 6 mph and the slope is about 10 to 14 degrees. These speeds, angles, and distances have been designed to provide the student with enough time to feel the balancing of the bicycle while coasting down the inclined surface such as ramp 2 while taking into account the student's apprehension of falling and the ease of repeating the skills steps until mastered.

In one embodiment of the present invention, an overhead zip line may be attached to a student-worn harness. Having students tethered as they transverse the inclined surface, such as ramp 2 may be useful in preventing the student from falling during the training. It also helps the student feel more secure and less apprehensive.

The methods described herein can be used to teach any beginner to ride bicycle, regardless of age or experience. Students as young as about 5 years old can be taught these skills. Selecting a bicycle that is suitable for a person's size, strength, and ability level is a skill known in the art. As described herein, many types and styles of bicycles can be used to teach the methods employing angular momentum.

The drawings are for illustration purposes only. The invention is not limited to the exemplary dimensions depicted in the drawings. Other dimensions and embodiments are herein included in the present invention.

What is claimed is:

1. A bicycle ramp comprising:
   a) a flat upper section comprising a receiving slot for engaging a rear wheel of a two-wheeled bicycle, wherein the receiving slot is defined by vertical and horizonal supports and a releasable stopper that is designed to move between a static position and a dynamic position, wherein in the static position, the bicycle is stabilized at the top of the ramp, and wherein in the dynamic position, the bicycle is allowed to move, and means for switching the releasable stopper between the static and dynamic positions;
b) a first angled section connected to the flat upper section; and
c) a second angled section that is connected to the first angled section and that is foldable onto the first angled section.

2. The bicycle ramp of claim 1, further comprising a third angled section that is connected to the second angled section that engages the ground and that is foldable onto the second angled section.

3. The bicycle ramp of claim 1, wherein the means for switching is a releasable pedal that is pushed downward to maintain the releasable stopper in the static position.

4. The bicycle ramp of claim 1, wherein the angled sections make a sloped inclined surface of about 12 to 15 degrees.

5. The bicycle ramp of claim 1, wherein the angled sections are about 10 to about 15 feet in combined length.

6. The bicycle ramp of claim 1, wherein the ramp is transportable on a utility trailer.

7. The bicycle ramp of claim 1, wherein the angled sections include safety barriers.

8. A combination of a bicycle ramp and a utility trailer comprising:
a) a bicycle ramp comprising a flat upper section comprising a receiving slot for engaging a rear wheel of a two-wheeled bicycle, wherein the receiving slot is further defined by a releasable stopper that is designed to move between a static position and a dynamic position, wherein the flat upper section is supported by the utility trailer and one or more angled sections to connect the flat upper section to a beneath surface; and
b) a wheeled utility trailer that supports the flat upper section of the ramp and the one or more angled sections of the ramp and further comprising a foldable gate.

9. The combination of claim 8, wherein the bicycle ramp and trailer combination comprise three angled sections, wherein a first angled section is connected to the flat upper section and a second angled section, wherein a third angled section is connected to a second angled section that is foldable onto the second angled section.

10. The combination of claim 8, wherein the releasable stopper is operably connected to a releasable pedal.

11. The combination of claim 8, wherein the angled sections make a slope with the beneath surface of about 12 to 15 degrees.

12. The combination of claim 8, wherein the angled sections are about 10 to about 15 feet in combined length.

13. The combination of claim 8, wherein the utility trailer has wheels and a hitch.

14. The combination of claim 8, wherein the angled sections include safety barriers.

15. A method of riding a two-wheeled bicycle comprising:
a) positioning a rider on a two-wheeled bicycle at the top of a bicycle ramp, wherein the ramp comprises one or more angled sections and a flat upper section, wherein the flat upper section comprises a receiving slot for engaging a rear wheel of the bicycle, wherein the receiving slot is defined by vertical and horizonal supports and a releasable stopper that is designed to move between a static position and a dynamic position, wherein in the static position, the bicycle is stabilized at the top of the ramp, and wherein in the dynamic position, the bicycle is allowed to move, and means for switching the releasable stopper between the static and dynamic positions, wherein the rider is positioned when the releasable stopper is in the static position;
b) switching the releasable stopper from the static position to the dynamic position; and
c) allowing the bicycle to move down the angled section of the ramp.

16. The method of claim 15, wherein the angled sections make an inclined surface with a slop of about 10 to 15 degrees.

17. The method of claim 15, wherein the rider wears a harness that is attached to an overhead zipline that runs parallel to the ramp.

18. The method of claim 15, wherein the means is a releasable pedal that is operably connected to the releasable stopper.

19. The method of claim 18, wherein the switching occurs by removing a downward pressure on the releasable pedal.

* * * * *